(12) United States Patent
Fischer

(10) Patent No.: US 6,579,927 B1
(45) Date of Patent: Jun. 17, 2003

(54) NANOCOMPOSITE MATERIAL

(75) Inventor: Hartmut Rudolf Fischer, Mierio (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 09/445,352

(22) PCT Filed: Aug. 7, 1998

(86) PCT No.: PCT/NL98/00453

§ 371 (c)(1),
(2), (4) Date: Dec. 10, 1999

(87) PCT Pub. No.: WO99/07790

PCT Pub. Date: Feb. 18, 1999

(30) Foreign Application Priority Data

Aug. 8, 1997 (NL) .............................................. 1006743

(51) Int. Cl.$^7$ ................................................. C08K 3/34
(52) U.S. Cl. .......................... 524/445; 525/69; 525/70; 525/72
(58) Field of Search ................................. 524/445, 447, 524/448, 449; 525/69, 70, 72

(56) References Cited

U.S. PATENT DOCUMENTS

| | | | |
|---|---|---|---|
| 4,814,364 A | | 3/1989 | Haruhiko et al. |
| 4,889,885 A | * | 12/1989 | Usuki et al. ................. 524/445 |
| 5,206,284 A | * | 4/1993 | Fukui et al. ................. 524/504 |
| 5,244,970 A | * | 9/1993 | Kobayashi et al. ........... 525/63 |
| 5,939,184 A | * | 8/1999 | Inoue et al. ................. 428/331 |

FOREIGN PATENT DOCUMENTS

| | | | | |
|---|---|---|---|---|
| WO | WO 93/11190 A1 | * | 6/1993 | ............ C08K/7/00 |
| WO | WO 98/530000 A1 | * | 11/1998 | ............ C08K/3/34 |

OTHER PUBLICATIONS

Fisgher H. R., Gielgens L. H., Koster T. P. M.; Nanocomposites from Polymers and Layered Materials, Acta Polym. 1999, 50, 122–126.*

Database WPI Section Ch, Week 8043 Dewwent publications Ltd., London, GB; Class A13, AN 80–75845C XP002061067 & JP 55 116743 A (Asahi Dow Ltd), Sep. 8, 1980.

Database WPI Section ch, Week 9411 Dewwent publications Ltd., London, GB; Class A21, AN 94–087311 XP002061068 & JP 06 037212 (Toray Ind Inc) Feb. 10, 1994.

* cited by examiner

*Primary Examiner*—Edward J. Cain
*Assistant Examiner*—Katarzyna Wyrozebski
(74) *Attorney, Agent, or Firm*—Muserlian, Lucas & Mercanti, LLP

(57) ABSTRACT

The invention relates to a nanocomposite material on the basis of clay having a layered structure and a cation exchange capacity of from 30–250 milliequivalents per 100 gram, a polymeric matrix and a block copolymer or a graft copolymer, which block copolymer or graft copolymer comprises one or more first structural units (A), which are compatible with the clay and one or more second structural units (B), which are compatible with the polymeric matrix.

20 Claims, No Drawings

NANOCOMPOSITE MATERIAL

The invention relates to a nanocomposite material, to a process for the preparation thereof and to a modified clay.

In the past decades, it has already often been proposed to improve the properties of polymeric materials by including in these materials a specific amount of a clay. The presence of a clay in a polymeric material particularly contributes to properties such as the mechanical strength and the heat resistance of the polymeric material.

A great difficulty when including a clay in a polymeric matrix resides in the mutually rather different nature of the materials. The polymeric material of the matrix is a usually non-polar organic material, whereas the clay is a much more polar inorganic material. Because of this difference the materials are poorly intermixable; they are intrinsically not mixable.

To circumvent this difficulty, it has been proposed to carry out the synthesis of the polymer that forms the matrix, a polymerization reaction, in the presence of the inorganic material. The idea was that the clay is perhaps more easily intermixable with a monomeric material than with a polymeric material. This method, however, proved to result in an inhomogeneous product which does not have the desired properties. The clay has a layered structure which cannot be broken easily, so that a homogeneous mixing is hard to obtain.

U.S. Pat. Nos. 4,889,885 and 4,810,734 propose to first swell the clay before adding monomeric material and carrying out a polymerization. To this end, the clay is modified with a swelling agent which increases the mutual distance between the layers of the clay structure to such an extent that monomers fit therebetween. After polymerization of the monomers polymeric material is then automatically located between the clay layers.

The swelling agent described in the above patents is so-called onium ions. Within this context an onium ion is a surfactant with a head group formed by an ammonium, pyridinium, sulfonium or phosphonium group, and one or more non-polar tails. The cationic head group of an onium ion is exchanged for cations between the crystalline layers of the clay. The tails must have a functional group capable of entering into a bonding interaction with the monomeric material, so that the polymers are formed between the layers of the clay.

Nevertheless, swelling with an onium ion also often proved ineffective in obtaining a proper mixing of the clay with a polymeric matrix. European patent application 0 747 322 describes that even when an onium ion with two non-polar tails is used, additional measures are necessary to homogeneously disperse a clay in a polymeric matrix which particularly consists of rubbery materials. Accordingly, the above European patent application proposes to introduce, in addition to an onium ion with two non-polar tails, one or more host molecules, also surfactant-like molecules, between the clay layers. A drawback of this method is that it is very complicated and does not in all polymeric materials enable a homogeneous dispersion of clay in the polymeric matrix.

Another approach is described in U.S. Pat. No. 5,578, 672. This approach comprises two steps. In the first step, an aqueous layered clay is swollen with monomers, oligomers or polymers that are compatible with water. This leads to a partly hydrophilic material. This first step is often referred to as the so-called intercalation. The distance between the clay layers is thereby increased. The second step comprises the mixing of the intercalated clay with a second polymer. This step is referred to as the so-called exfoliation and must lead to loose individual clay plates. The resulting product is finally included in the desired polymeric matrix through extrusion. In this procedure it is essential that the clay contains a specific minimum content (usually at least 5%) of water. The method described in this U.S. patent is rather laborious and complicated. Moreover, this method is not applicable to many polymeric matrices, so that a clay cannot be included in every polymeric material.

The international patent application WO-A-93/04118 describes a composite material on the basis of a polymeric matrix and a clay, which clay is modified with a specific compound. This specific compound consists of a silane or an onium group and a group compatible with the polymeric matrix. It has turned out that with this specific compound a substantial dispersion of a clay in a polymeric matrix is only obtainable with nylon as polymeric matrix.

It is an object of the invention to provide a nanocomposite material in which a clay is very homogeneously dispersed in a polymeric matrix, which nanocomposite material is easy to prepare. The invention therefore relates to a nanocomposite material on the basis of a clay having a layered structure and a cation exchange capacity of from 30 to 250 milliequivalents per 100 gram, a polymeric matrix and a block copolymer or graft copolymer, which block copolymer or graft copolymer comprises one or more first structural units (A), which are compatible with the clay, and one or more second structural units (B), which are compatible with the polymeric matrix.

It has been found that by using a block copolymer or graft copolymer of the above-mentioned type a clay can be very homogeneously mixed with a polymeric matrix. Moreover, by suitably selecting the structural units of the block copolymer or the graft copolymer a clay can be included in a polymeric matrix of any desired nature. A nanocomposite material according to the invention has very favorable properties, such as a great heat resistance, a great mechanical strength, in particular a great tensile strength and a good impact resistance, a low electric conductivity, a high glass transition temperature and a very low permeability to gases, such as oxygen or water vapor, and liquids, such as water or solvents.

A nanocomposite material according to the invention is, as stated before, based on a clay having a layered structure. The clay may be of a natural or synthetic nature. Preferably, the clay has a large contact surface.

Very suitable are clay types based on layered silicates, such as layered phyllosilicate composed of magnesium and/or aluminum silicate layers which are each about 7–12 Å in thickness. Especially preferred are smectite-like clay minerals, such as montmorillonite, saponite, hectorite, fluorohectorite, beidellite, nontronite, vermiculite, halloysite and stevensite. These materials impart very favorable mechanical properties and a great heat resistance to a nanocomposite material.

A suitable clay type has a cation exchange capacity of from 30 to 250 milliequivalents per 100 gram. When this capacity exceeds the above upper limit, it proves difficult to finely disperse the clay on a molecular level because of the strong mutual interaction of the clay layers. When the cation exchange capacity is lower than the above lower limit, it turns out that the clay is hard to modify, owing to the fact that the interaction with the block copolymer or graft copolymer is small. There is preferably used a clay having a cation exchange capacity of from 50 to 200 milliequivalents per 100 gram.

The polymeric matrix present in a nanocomposite material according to the invention can be formed by any polymeric material. Both homopolymers and copolymers may serve as polymeric matrix. It is one of the advantages of the invention that by selecting the block copolymer or the graft copolymer any polymeric matrix can be modified with a clay of the above-described nature. Accordingly, by providing the right constituents, e.g. in the form of a kit, the skilled worker is afforded an opportunity to prepare for any desired use a combination of a specific clay and a specific polymeric material, and thus a desired nanocomposite material.

Polymeric materials suitable as polymeric matrix in a nanocomposite material according to the invention are both polyadducts and polycondensates. Examples are polyolefins, such as polyethylene or polypropylene, vinyl polymers, such as polystyrene or polymethyl methacrylate, polyesters, such as polyethylene terephthalate or polycaprolactone, polycarbonates, polyaryl ethers, polysulfones, polysulfides, polyamides, polyetherimides, polyether esters, polyether ketones, polyether ester ketones, polyvinyl chloride, polyvinylidene chloride, polyvinylidene fluoride, polysiloxanes, polyurethanes and polyepoxides. There are preferably used polyolefins, vinyl polymers, polyesters, polyethers, polysiloxanes or acrylic polymers, because the properties of these materials show a substantial improvement due to the presence of a clay.

Besides on the clay described before and the polymeric matrix, a nanocomposite material according to the invention is based on a block copolymer or a graft copolymer. This block copolymer or graft copolymer is a polymer comprising first structural units (A), which are compatible with the clay, and one or more second structural units (B), which are compatible with the polymeric matrix. When the structural units occur in a straight polymeric chain, reference is made to a block copolymer. When the structural units (A) occur in a chain which is a branch of the chain in which the structural units (B) occur, or vice versa, reference is made to a graft copolymer.

The structural units (A) are compatible with the clay. By this is meant that these units in themselves, i.e. not in the copolymeric form with the structural units (B), are excellently mixable with the clay. The structural units (A) are preferably of a hydrophilic nature. Materials suitable as structural units (A) are polyvinylpyrrolidone, polyvinyl alcohol, polyethylene oxide, linear or dendritic polyethylenimine, polyoxymethylene, polytetrahydrofuran, polyacrylic acid, polymethacrylic acid, polydimethylacrylamide, polymethylacrylamide, copolymers of acrylic acid or methacrylic acid and acrylamide, polyisopropylaride, starch, polysaccharides and cellulose derivatives. It is preferred that at least one of the structural units (A) is derived from monomeric units selected from the group of vinylpyrrolidone, vinyl alcohol, ethylene oxide, ethylenimine, vinylpyridine, acrylic acid and acrylamide. These preferred units (A) are excellently compatible with a clay.

Very suitable materials for use as structural units (A) have a molecular weight of from 100 to 5,000, preferably from 1,000 to 3,000. It is also advantageous when the material of the structural units (A) contains from 5 to 20 monomeric units.

The structural units (B) are compatible with the polymeric matrix. By this is meant that these units in themselves, i.e. not in the copolymeric form with the structural units (A), are excellently mixable with the material of the polymeric matrix. It is also possible that the nature of the structural units (B) is the same as the nature of the polymeric matrix. An example is a polymeric matrix of polyethylene having a molecular weight of 5,000 and structural units (B) of polyethylene having a molecular weight of 2,500. It is even possible that the material of the polymeric matrix is exactly equal to that of the structural units (B). In the above example, the structural units (B) could then be of polyethylene having a molecular weight of 5,000.

The nature of the structural units (B) will depend on the nature of the polymeric matrix. Materials suitable as structural units (B) are, e.g., polyolefins, such as polyethylene or polypropylene, vinyl polymers, such as polystyrene or polymethyl methacrylate, polyesters, such as polyethylene terephthalate or polycaprolactone, polycarbonates, polyaryl ethers, polysulfones, polysulfides, polyamides, polyetherimides, polyether esters, polyether ketones, polyether ester ketones, polyvinyl chloride, polyvinylidene chloride, polyvinylidene fluoride, polysiloxanes, polyurethanes and polyepoxides. There are preferably used polyolefins, vinyl polymers, polyesters, polyethers, polysiloxanes or acrylic polymers.

According to a preferred embodiment, a block copolymer or a graft copolymer is used in which the structural units (A) contain at least 2 monomeric units and the structural units (B) contain the same or a larger amount of monomeric units as/than the structural units (A). It has been found that with such a block copolymer or graft copolymer a very finely divided homogeneous dispersion of the clay is obtained in the polymeric matrix.

In a nanocomposite material according to the invention, the weight ratio of the amount of block copolymer or graft copolymer to the amount of clay is preferably between 0.01:1 and 100:1, with a special preference between 0.05:1 and 6:1. The weight ratio of the amount of clay to the amount of polymeric matrix is preferably between 1:200 and 2:1, with a special preference between 1:50 and 1.2:1.

The invention further relates to a process for preparing a nanocomposite material as described above. It should be noted that it is possible in this connection to first bring together the clay and the block copolymer or graft copolymer or first bring together the polymeric matrix and the block copolymer or graft copolymer and only then add the required third constituent. It is further possible to simultaneously bring together all the three required constituents, namely clay, polymeric matrix and block copolymer or graft copolymer.

It is preferred, however, to first modify the clay with a block copolymer or graft copolymer of the above-described nature. The invention therefore also relates to a modified clay suitable for preparing a nanocomposite material as described above, based on a clay having a layered structure and a cation exchange capacity of from 30 to 250 milliequivalents per 100 gram, which clay is modified with a block copolymer or a graft copolymer, which block copolymer or graft copolymer comprises one or more first structural units (A), which are compatible with the clay, and one or more second structural units (B). This modified clay can then be suitably mixed with a polymeric matrix. By suitably selecting the structural units (B), a skilled worker is capable of including a clay in a polymeric matrix of any desired nature.

When preparing a nanocomposite material according to the invention, in any of the above-mentioned sequences of bringing together, it is preferred to grind or pulverize the clay previously. Such a pretreatment of the clay results in an easier and better mixability of the different constituents.

The constituents of a nanocomposite material according to the invention may be brought together in any suitable manner, provided this manner gives a good mixture.

Examples of methods of bringing together the constituents comprise agitation for a longer period of time at elevated temperature and extrusion. Suitable mixing conditions depend on the nature of the selected constituents and can be easily determined by a skilled worker. The agitation may be carried out, e.g., at a temperature between 40 and 80° C. and the extrusion, e.g., between 40 and 150° C. in a twin-screw extruder.

The nanocomposite materials according to the invention may be very suitably used for a great diversity of applications. The materials are excellently processable and can be molded in conventional molding steps, such as injection molding and extrusion processes. Molded articles of different nature can be prepared from the present nanocomposite material. Examples comprise any application for which the material of the polymeric matrix is suitable. As preferred applications, packaging and construction materials may be mentioned.

The invention will now be explained in more detail with reference to the following examples.

EXAMPLE I

A smectic clay mineral (montmorillonite, 1 g) having a cation exchange capacity of 85 milliequivalents per 100 gram was mixed together with 1.3 g of a block copolymer consisting of one polyethylene oxide block (PEO) and one polystyrene block (PS) for 3 hours by agitating at a temperature of 80° C. The molecular weight of the PEO block was about 1,000 and that of the PS block about 3,000.

The resulting material was characterized with X-ray diffraction and differential scanning calorimetry. This characterization showed that substantial exfoliation had occurred.

Subsequently, the exfoliate was extruded together with a styrene homopolymer. The final product had a clay content of 5% by weight, based on the final product. from the results of studies by means of X-ray diffraction and electron microscopy it was determined that the clay was homogeneously dispersed in the styrene homopolymer.

The tensile force modulus, determined according to DIN 53455, of the modified styrene homopolymer was compared with that of the non-modified styrene homopolymer, which showed that the tensile force modulus of the modified material was 10% higher.

EXAMPLE II

A smectic clay mineral (bentonite, 1 g) having a cation exchange capacity of 85 milliequivalents per 100 gram was suspended at 50° C in tetrahydrofuran and agitated for 3 hours with 1.3 g of a block copolymer consisting of one poly-4-vinylpyridine block (P4VP) and one polystyrene block (PS). The molecular weight of the P4VP block was about 3,000 and that of the PS block about 27,000.

The resulting material was characterized with X-ray diffraction and differential scanning calorimetry. This characterization showed that partial exfoliation had occurred.

The exfoliated material was extruded together with a styrene homopolymer. There was thus obtained a final product which contained homogeneously dispersed, fully exfoliated clay plates. The clay content of the final product was 50% by weight, based on the final product.

EXAMPLE III

A smectic synthetic clay mineral (saponite, 1 g) having a cation exchange capacity of 83 milliequivalents per 100 gram was suspended at 50° C. in tetrahydrofuran and agitated for 3 hours with 1.3 g of a block copolymer consisting of one dendritic polyethylenimine block (dend-$P_8$ PEI) and one polystyrene block (PS). The molecular weight of the dend-$P_8$ PEI block was about 1,000 and that of the PS block about 2,000.

By means of X-ray diffraction it was determined that the layered mineral structure was intercalated to a structure having a mutual distance between the layers of 12.7 Å.

Coextrusion with a styrene homopolymer led to a clear transparent material with exfoliated clay layers. The clay content of the final product was 5% by weight, based on the final product.

EXAMPLE IV

A montmorillonite (1 g) having a cation exchange capacity of 105 milliequivalents per 100 gram was suspended in tetrahydrofuran and mixed for 3 hours with 1.3 g of a multiblock copolymer consisting of one dendritic polyethylenimine core block ($dend_{16}$) functionalized with 16 octadecyl groups (block B, PE-compatible). The molecular weight of the dendritic polyethylenimine core block was 1,600.

An X-ray diffraction study of the resulting material showed that the layered mineral structure was intercalated with the multiblock copolymer. The mutual distance between the intercalated clay layers was 30.4 Å.

The intercalated material was extruded together with polyethylene. The final product contained 5% by weight of completely exfoliated clay, based on the final product, and was clear and transparent.

The tensile force modulus, determined according to DIN 53455, of the modified styrene homopolymer was compared with that of the non-modified styrene homopolymer, which showed that the tensile force modulus of the modified material was 100% higher.

I claim:

1. A process for preparing a nanocomposite material consisting essentially of a clay having a layered structure, a polymeric matrix and a block copolymer or a graft copolymer, said process comprising exfoliating a clay having a layered structure and a cation exchange capacity of from 30 to 250 milliequivalents per 100 gram with a block copolymer or a graft copolymer, which block copolymer or graft copolymer comprises one or more first structural units (A), which are compatible with the clay, and one or more second structural units (B), which are compatible with the polymeric matrix, and mixing the block or graft copolymer exfoliated clay with said polymeric matrix.

2. The process of claim 1, wherein said exfoliating is carried out in the presence of said polymeric matrix.

3. The nanocomposite material formed by the process of claim 1.

4. The nanocomposite material of claim 3, wherein the weight ratio of the amount of block copolymer or graft copolymer to the amount of day is between 0.05:1 and 6:1.

5. The nanocomposite material of claim 3 wherein the weight ratio of the amount of clay to the amount of polymeric matrix is between 1:50 and 1,2:1.

6. A molded article made from a nanocomposite material prepared according to the process of claim 1.

7. A nanocomposite material according to claim 3, wherein the clay has a cation exchange capacity of from 50 to 200 milliequivalents per 100 gram.

8. A nanocomposite material according to claim 3, wherein the polymeric matrix is selected from the group consisting of polyolefins, vinyl polymers, polyesters, polyethers, polysiloxanes and acrylic polymers.

9. A nanocomposite material according to claim 3, wherein the structural units (A) have a number average molecular weight of from 100 to 5,000 and the structural units (B) have a number average molecular weight of from 100 to 20,000.

10. A nanocomposite material according to claim 3, wherein the structural units (A) contain at least 2 monomeric units, and wherein the structural units (B) contain the same or a larger amount of monomeric units as/than the structural units (A).

11. A nanocomposite material according to claim 10, wherein the structural units (A) contain from 5 to 20 monomeric units.

12. A nanocomposite material according to claim 3, wherein at least one of the structural units (A) is derived from monomeric units selected from the group of vinylpyrrolidone, vinyl alcohol, ethylene oxide, ethyleneimine, vinylpyridine, acrylic acid and acrylamide.

13. A nanocomposite material according to claim 3, wherein the weight ratio of the amount of block copolymer or graft copolymer to the amount of clay is between 0.01:1 and 100:1.

14. A nanocomposite material according to claim 3, wherein the weight ratio of the amount of clay to the amount of polymeric matrix is preferably between 1:200 and 2:1.

15. A modified clay suitable for preparing a nanocomposite material according to claim 3, based on a clay having a layered structure and a cation exchange capacity of from 30 to 250 milliequivalents per 100 gram, which clay is exfoliated with a block copolymer or a graft copolymer, which block copolymer or graft copolymer comprises one or more first structural units (A), which are compatible with the clay, and one or more second structural units.

16. A nanocomposite material prepared according to the process of claim 1, comprising a clay having a layered structure and a cation exchange capacity of from 30 to 250 milliequivalents per 100 gram, a polymeric matrix and a block copolymer or a graft copolymer, which block copolymer or graft copolymer comprises one or more first structural units (A), which are compatible with the clay, and one or more second structural units (B), which are compatible with the polymeric matrix.

17. A process for preparing a nanocomposite material comprising a clay having a layered structure, a polymeric matrix and a block copolymer or a graft copolymer, said process consisting essentially of exfoliating a clay having a layered structure and a cation exchange capacity of from 30 to 250 milliequivalents per 100 gram with a block copolymer or a graft copolymer, which block copolymer or graft copolymer comprises one or more first structural units (A), which are compatible with the clay, and one or more second structural units (B), which are compatible with the polymeric matrix, and mixing the block or graft copolymer exfoliated clay with said polymeric matrix.

18. The nanocomposite material formed by the process of claim 17.

19. A nanocomposite material according to claim 18, wherein the clay has a cation exchange capacity of from 50 to 200 milliequivalents per 100 gram.

20. A nanocomposite material according to claim 18, wherein the structural units (A) have a number average molecular weight of from 100 to 5,000 and the structural units (B) have a number average molecular weight of from 100 to 20,000.

* * * * *